United States Patent [19]
Blank

[11] 3,968,391
[45] July 6, 1976

[54] BRUSH HOLDER FOR ELECTRICAL APPARATUS

[75] Inventor: Karl Blank, Mannheim, Germany

[73] Assignee: BBC Brown Boveri & Company Limited, Baden, Switzerland

[22] Filed: Sept. 30, 1974

[21] Appl. No.: 510,596

[30] Foreign Application Priority Data
Oct. 8, 1973  Germany.............................. 2350456

[52] U.S. Cl................................. 310/240; 310/245
[51] Int. Cl.² ........................................ H02K 13/00
[58] Field of Search ........... 310/238, 239, 240, 242, 310/245, 246, 247, 219, 232

[56]  References Cited
UNITED STATES PATENTS

| | | | |
|---|---|---|---|
| 2,472,018 | 5/1949 | Johnson............................. | 310/240 |
| 2,775,717 | 12/1956 | Laing................................... | 310/246 |
| 3,387,155 | 6/1968 | Krulls.................................. | 310/245 |
| 3,466,481 | 9/1969 | Sckerl................................. | 310/239 |
| 3,523,288 | 8/1970 | Thompson.......................... | 310/245 |
| 3,526,797 | 9/1970 | Jueschke............................ | 310/245 |
| 3,609,429 | 9/1971 | Thompson.......................... | 310/246 |

*Primary Examiner*—R. Skudy
*Attorney, Agent, or Firm*—Pierce, Scheffler & Parker

[57]  ABSTRACT

A brush holder structure for use in conjunction with transfer of current between a brush and a collector ring or commutator, respectively, on the rotor component of a dynamoelectric machine and which can be removed while the machine is in operation in order to renew worn-down brushes includes an electrically conductive support designed sectionally in L- or U-shaped form provided with a bore into which is screwed a combined mounting and plug-in device adapted to be removably inserted and interlocked with the brush rail structure of the electrical machine. Secured to the outer side of the depending leg of the L-shaped support, or to each such leg in the case of an inverted U-shape, is an open-bottom brush box containing a spring-loaded brush, and at the inner side of this leg a brush retaining lever is pivotally mounted and spring loaded in such manner that the lower end of the lever automatically engages and retains the brush against movement as the combined mounting and plug-in device is withdrawn from the brush rail, and releases from contact with the brush when the combined mounting and plug-in device is re-inserted in the brush rail.

13 Claims, 15 Drawing Figures

BRUSH HOLDER FOR ELECTRICAL APPARATUS

The present invention relates to an improvement in a brush holder structure for use in conjunction with transfer of current between the brush and a collector ring, or commutator, respectively, on the rotor component of a dynamoelectric machine, and wherein means are provided for replacement of the brush holder during operation of the machine, the brush holder comprising a support with at least one brush box within which one or more carbon brushes are located and a mounting and plug-in device which is insertable into a bore provided in the support. Such brush holder structures are known, for example, as disclosed in German patent DT-PS No. 1,282,780 and also in the 1967 edition of "BBC News", pages 588–590.

Brush holders of this general type are required for ensuring continuous operation of generators so far as the electrical machinery is concerned. Worn-out carbon brushes are thus replaced during operations without the necessity for stopping the machinery. To effect replacement, the individual brush holders are removed, not all at the same time, but rather on a one-after-the-other basis, the worn-down brushes in one holder being removed and replaced with new ones and the holder being reinserted in the plug-in device and another then being removed for brush replacement. The temporarily increased current load placed on the brushes still engaged with the surface of the collector ring or commutator, is immaterial in view of the short time involved for replacement.

The known constructions of such brush holders comprise primarily a plug-in component with a cylindrical plug connector, an interlocking jack, a mounting plate and brush holders screwed onto this plate. Constructions of this type are rather difficult to handle and very heavy if used for brush systems having more than two brush holders with large carbon cross-sections.

The objective of the present invention is to provide an improved brush holder construction wherein their size makes them more easy to handle and wherein their weight is also reduced. This objective is attained in that the brush holder support designed sectionally in L- or U-shaped form, is provided with a bore into which is screwed an integral mounting and plug-in device, that there is provided at the inner side of each brush holder structure at least one lever pressed at one end thereof against the brush by spring force, its side facing away from the brush at the other end thereof being provided with a projection which during plugging in of the brush holder structure will press against the outer face of the brush holder rail in such manner that the lever end pressing against the side of the brush will be lifted off to release the brush, and that the inside of the brush box is provided with at least one groove terminating short of the lower end of the box which is engaged by a complementary projection at the side of the brush and which prevents the brush, which is loaded by a spring in the direction of the collector ring, or commutator, from being pushed downwardly in the box beyond the position where the brush projection reaches the lower end of the groove. In the case of the present invention, the plate of the plug-in device no longer serves as the support for the brush holder since the brush-securing device in accordance with the invention is provided with a threaded bore into which is screwed the single-piece holder and plug-in device. The plug connector and interlocking jack are combined into a single unit which can be inserted into the brush holder support. The above-mentioned lever for each brush which holds the latter in place against movement in its box during replacement are under spring pressure and thus retain the brushes. Only when the lever end strikes against the side of the brush rail prior to seating of the brushes at the collector ring or commutator will the brushes be released, while during an extraction operation, shortly after the lift-off the brush will be held in place in the box as soon as the lever end clears the zone of contact with the side of the brush holder rail.

In the embodiment of the invention wherein the brush holder support structure is designed in the form of an inverted U-shape symmetrical to the axis of the bore through the brush rail in which the plug-in member is inserted, a brush box and brush structure is secured to each depending leg of the U-support. This arrangement has the advantage that the reaction forces which arise during the plug-in operation are distributed symmetrically thus greatly facilitating this operation. Such an arrangement is also advantageous for automatic engaging and disengaging devices to be actuated, for example, by auxiliary pneumatic of magnetic equipment. This symmetrical arrangement also permits efficient utilization of the perimeter of the collector ring or commutator relative to placement of the brushes and simplifies the brush frame construction because the number of brush rails is less than the number required for the known constructions. The brushes will stand precisely radially in the case of a completely new collector ring or commutator. After the wearing down of the ring or commutator there will occur certain divergences from a true radial position but which, however will not have any significant effect on the collection of current in view of the relatively minor change in diameter.

In accordance with a further development of the invention, several brush boxes are arranged in side-by-side relation parallel to the axis of the dynamoelectric machine. Also, the stranded wire connecting the brush to the brush holder is secured to the brush box which has the advantage that the operator, when removing the holder will not touch the live wire.

In accordance with the invention, it is further provided that a rolled tape spring serves as a spring means for resiliently pressing the lower faces of the carbon brushes against the surface of the collector ring or commutator, respectively, the advantage being that such spring and its support is easily replaceable. Also, if carbon brushes are used which are very broad in a circumferential direction it is possible to design the rolled tape spring support in a U-shaped form so that it can carry two such springs. It is also possible, depending upon the position of the plug-in devices and the brush frame, to arrange the rolled tape springs reciprocally, if the force component acting upon the carbon brush, relative to the sense of rotation, is to be unidirectional in all carbon brushes.

According to one embodiment of the invention, the brush holder structure includes more than one mounting and plug-in device which can be inserted into corresponding bores provided in the axially extending brush holder rail which carries the current. Expecially a design using two holding and plug-in devices and corresponding hand grips permits ease of operating the replaceable brush holder structure, since it can be conveniently held by both hands of the operator. Systems of this type can accommodate a maximum of six brush boxes without impairing proper servicing of the rotor.

Additional details of construction and advantageous further developments of the invention are disclosed in several different preferred embodiments to be described below in detail and are illustrated in the accompanying drawings wherein.

Figure 1:
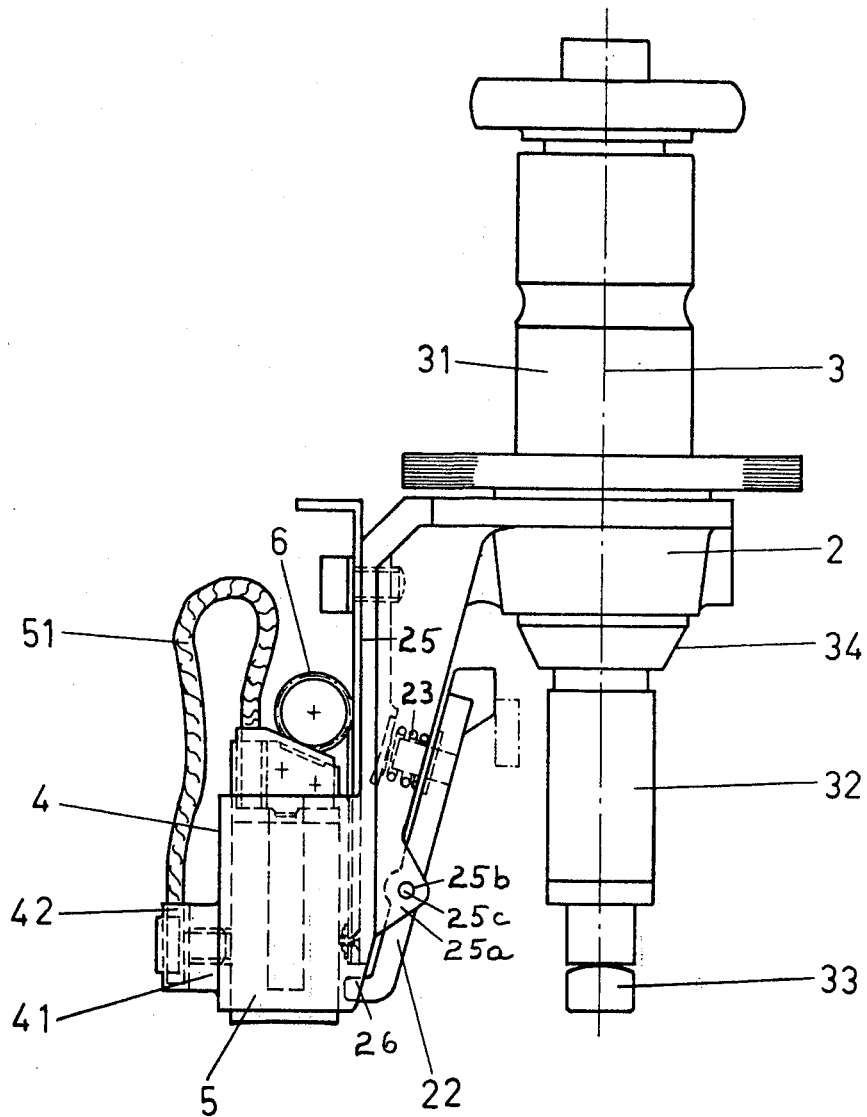
FIG. 1 is a side elevation of one embodiment of the improved brush holder structure utilizing an L-shaped support member, one leg of the support member providing the support for the brush box and the other leg being provided with a threaded bore into which the mounting and plug-in contact device is screwed.
Figure 2:
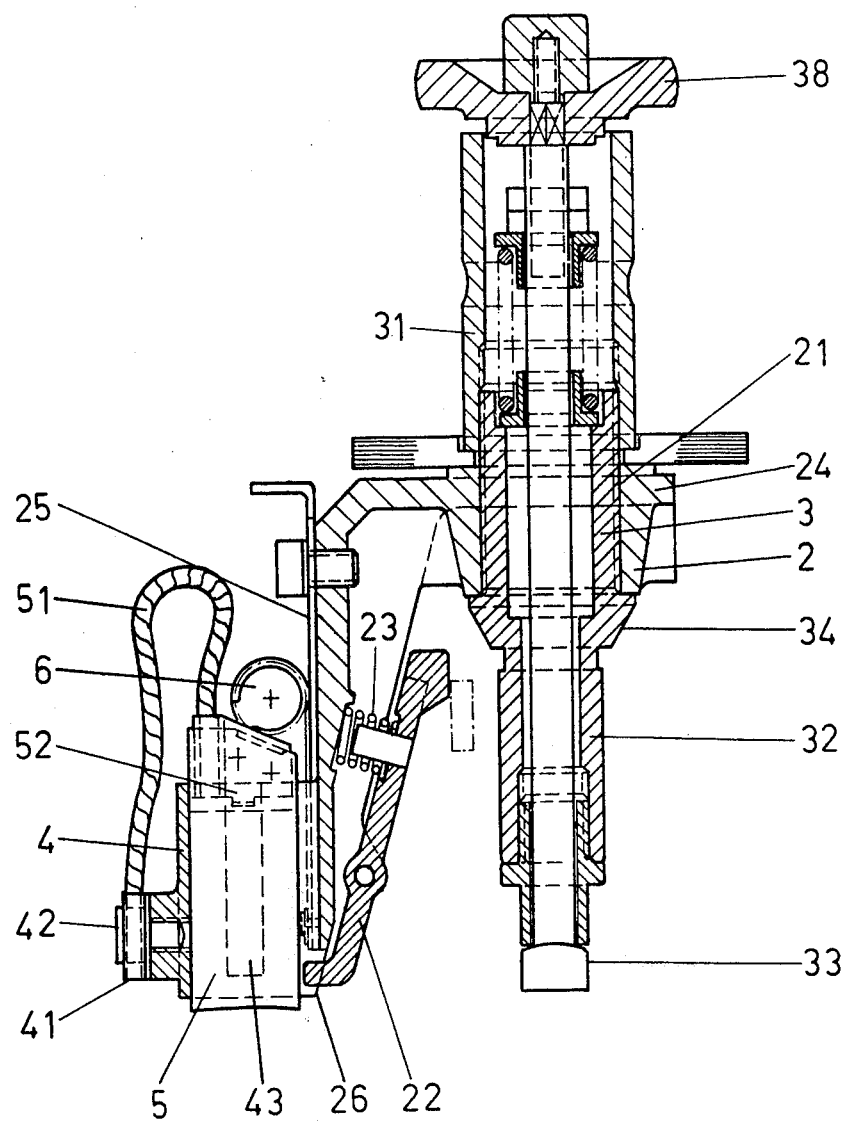
FIG. 2 is a side view similar to FIG. 1 but with the parts shown in section.
Figure 3:
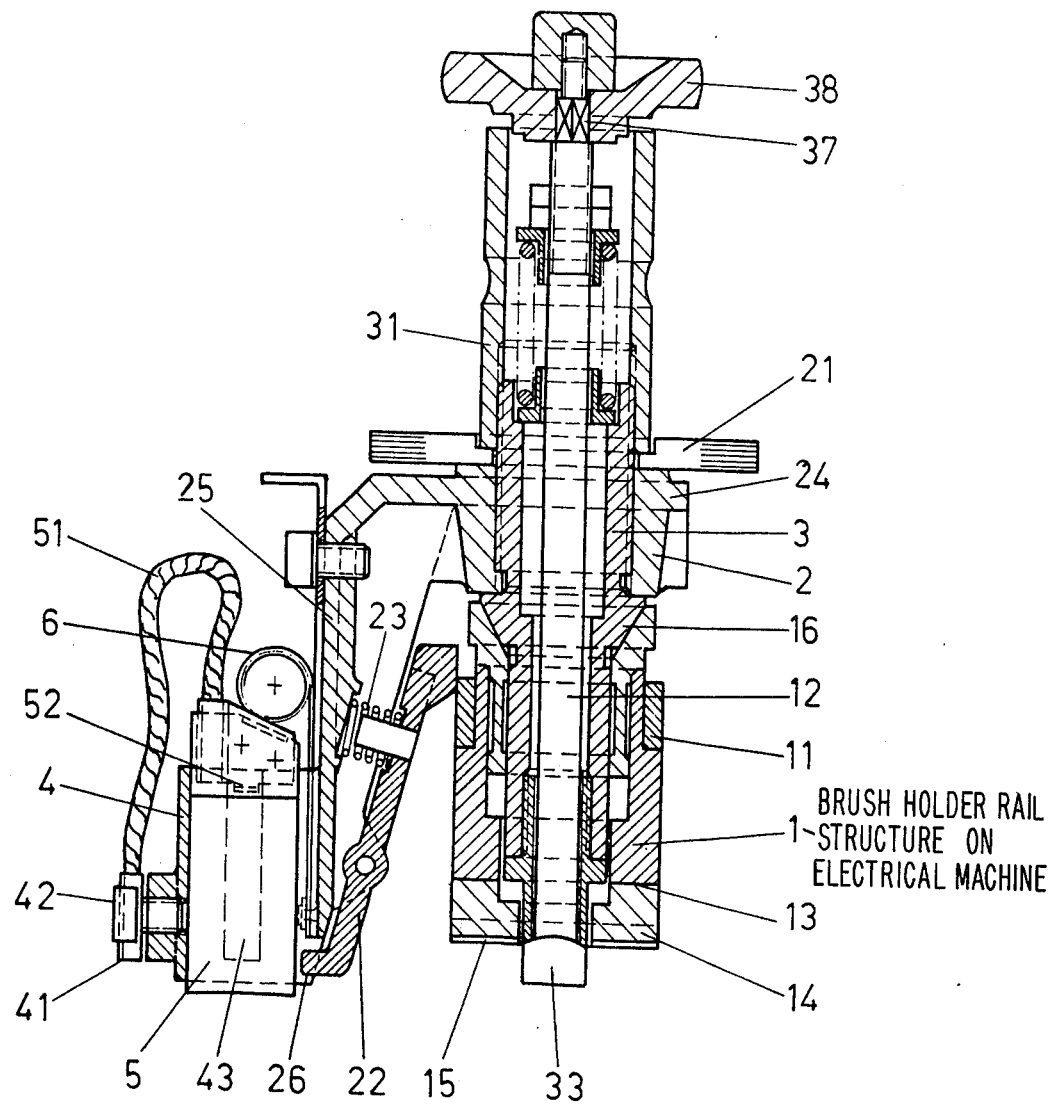
FIG. 3 is a view similar to FIG. 2 but also including the brush rail of the electrical machine structure and illustrating the manner in which the mounting and plug-in contact device is removably interlocked with the rail for brush removal and replacement.

With reference now to the drawings and to FIGS. 1 to 3 in particular, the current-carrying brush holder rail structure on the electrical machine which supports the overall brush structure on the rotor of the machine so that the individual brushes run in contact with the surface of the collector ring or commutator, respectively on the rotor is indicated at 1. Since the invention concerns only the structure of the brush holder and its cooperation with the brush holder rail on the electrical machine, the remaining structure of the machine, which is conventional, has not been illustrated, in order to simplify the drawings. The opposite sides of this rail are provided with recesses into which are set wear strips 11 which are adapted to bear against one end of a lever 22 to be described later. At least one bore 12 is provided in the brush rail 1 into which the mounting and plug-in contact device 3 of the brush holder structure is inserted and locked. Within the region of the bore 12 there is further provided, at the bottom side 13 of the brush rail 1, a structural component 14 which has a non-circular bore and is provided at its under side with a groove 15 which is engageable by an interlocking head 33 of a locking spindle 35 which operates axially within the plug-in device 3.

Figure 4:
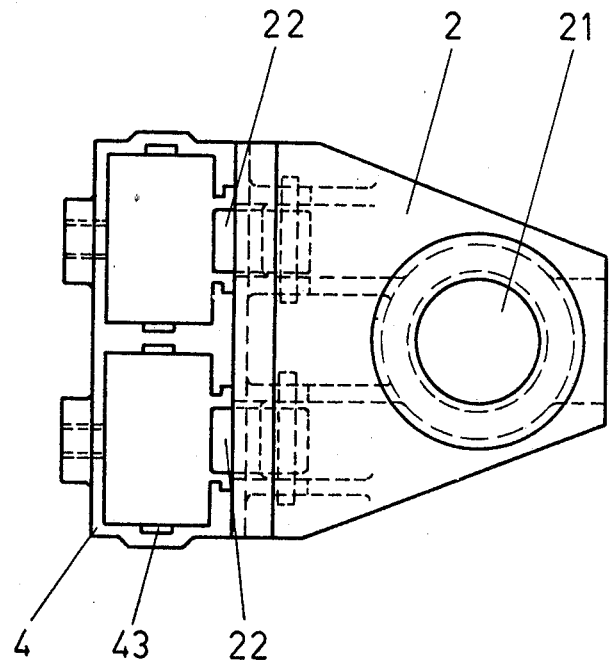
FIG. 4 is a top plan view of a modified embodiment wherein the L-shaped support member is provided with a brush box in which a pair of brushes are arranged in side-by-side relation.
Figure 5:
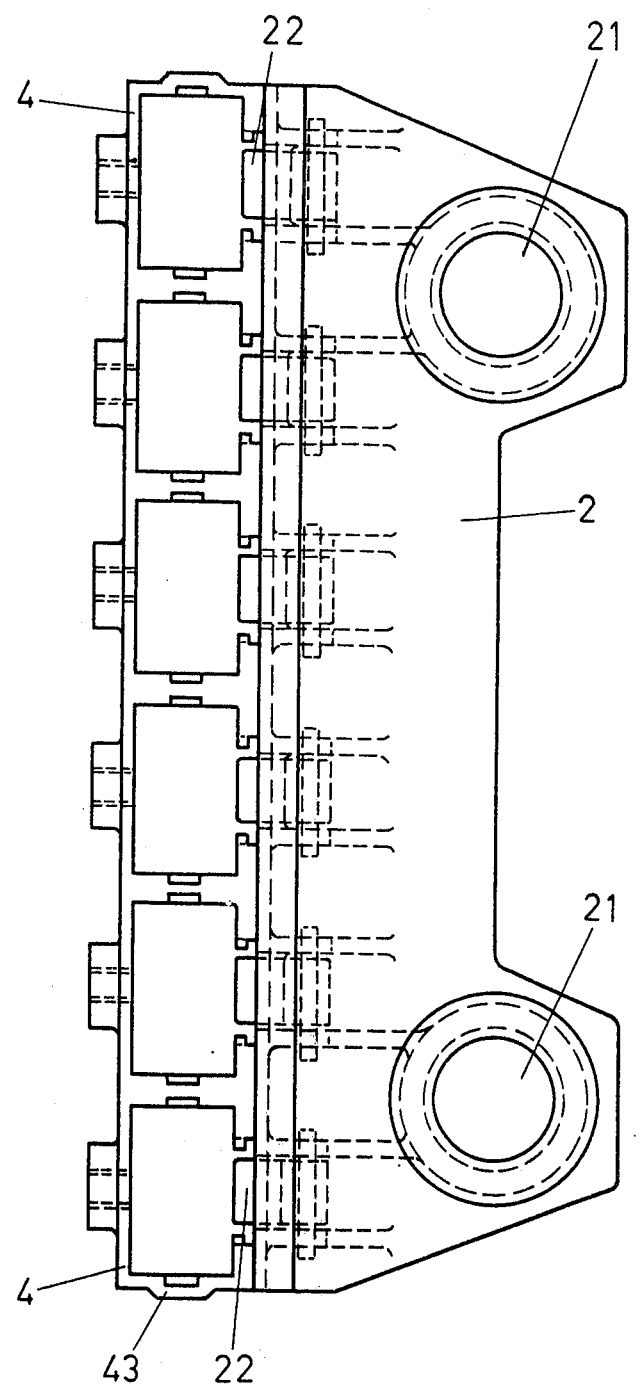
FIG. 5 is a top plan view of a further modification wherein the L-shaped support member is provided with two threaded bores and into each of which a mounting and plug-in contact device is screwed, the support member being provided with a brush box structure in which six brushes are arranged in side-by-side relation.

With respect to the embodiment of the invention as illustrated in FIGS. 1 to 5, the support member 2 providing support of the brush box and to which is also secured the plug-in contact device 3 is seen to have an L-shaped configuration. One leg 24 of this support member extending in a tangential direction is provided with a single threaded bore 21, or two such bores in the modified embodiments to FIGS. 4 and 5, into which the middle threaded portion 36 of the plug-in contact device 3 is screwed so as to remain a part thereof. Secured to the other leg 25 of the support member 2 which extends in the radial direction of the rotor is a brush box 4 in which a carbon brush 5 is inserted. In FIGS. 4 and 5, the brush box structure is so constructed as to carry a plurality of brushes, FIG. 4 showing a two-brush arrangement and FIG. 5 a six-brush arrangement.

Located at the inside of the leg 25 is a projection 25a provided with a bore 25b for receiving a pivot pin 25c on which an interlocking lever 22 is pivotally mounted. The lower end of lever 22 is provided with a projection 26 which is adapted to press against the body of the carbon brush whenever the brush box supporting structure 2 and the plug-in contact device 3 secured within the latter is removed from the brush rail 1 thus preventing the carbon brushes from being forced out of the brush box at this time by the pressure exerted by the rolled tape spring 6. The lower end of the interlocking lever is forced against the carbon brush 5 by a compressed spring 23 one end of which bears against the inside of leg 25 and the other end against the lever 22 at the opposite side of the pivotal axis from the projection 26 at the lower end thereof.

The brush box 4 is provided with a projection 41 having a socket 42 for receiving the terminal end of the current-carrying stranded wire 51, the opposite end of the wire being of course secured to the brush itself. The path of the current flow to or from the carbon brush, or brushes, depending upon the machine is thus the wire lead 51, socket 42, projection 41, brush box 4 and thence through the L-shaped support member 2 and the mounting and plug-in contact device 3 to the brush rail 1.

At the inside walls of the brush box 4 there are further provided grooves 43 which do not, however extend through the entire length of the box but rather terminate at a distance above the open bottom of the box. Slidable in these grooves are lateral projections 52 on the brush 5 to prevent the latter from being forced entirely out of the brush box after the brushes have been worn down so far that the projections 52 are stopped at the bottom of the grooves.

Figure 6:
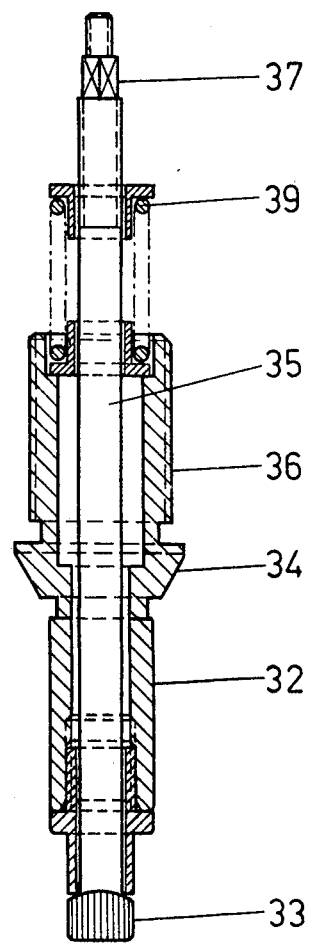
FIG. 6 is a sectional view of the mounting and plug-in contact device itself, showing the interlocking spindle and head at one end thereof by which the plug-in contact device and the brush box support structure secured to it can be removably interlocked with the brush rail structure.
Figure 7:
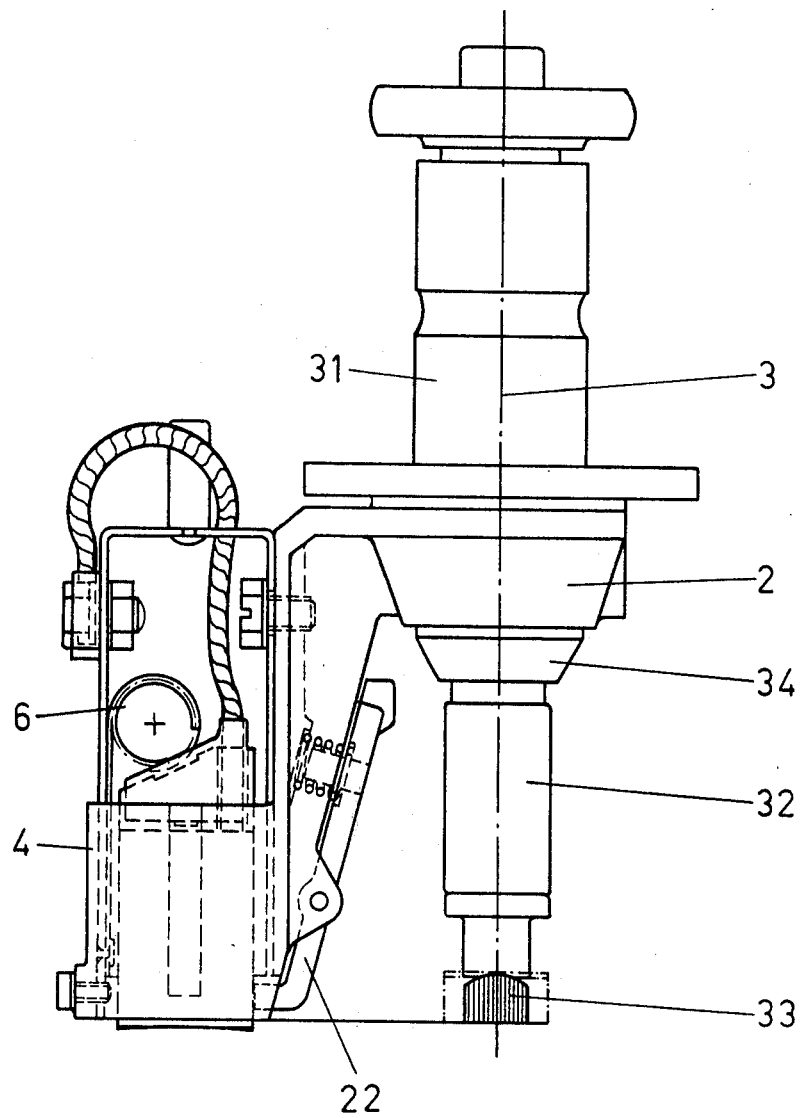
FIG. 7 is a side elevation similar to FIG. 1 but wherein the brush spring support has a U-shape, the support accommodating two adjacent rolled tape springs.
Figure 8:
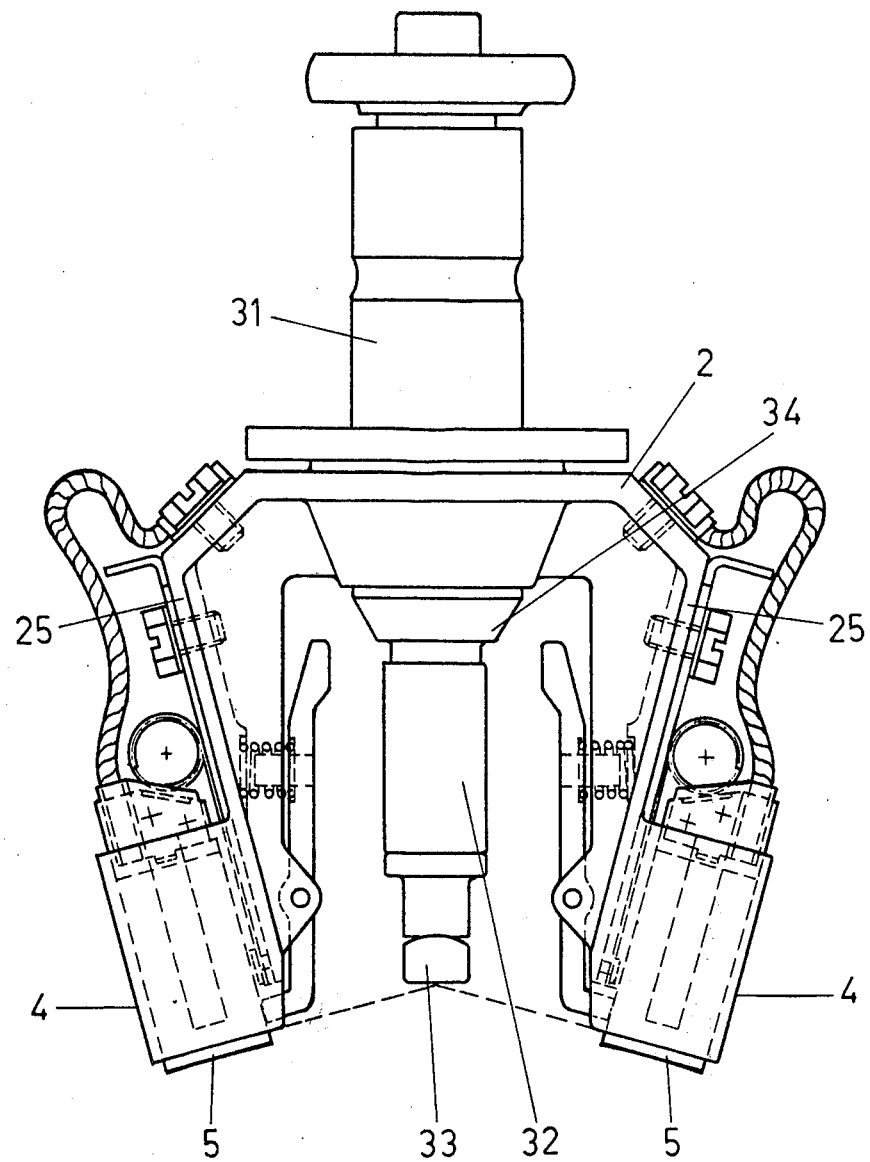
FIG. 8 is a side elevation illustrating a somewhat different embodiment wherein the support member for the brushes has an inverted U-shaped configuration and wherein each downwardly extending leg thereof supports a brush box and wherein the mounting and plug-in contact device is located between the brush box supporting legs.
Figure 9:
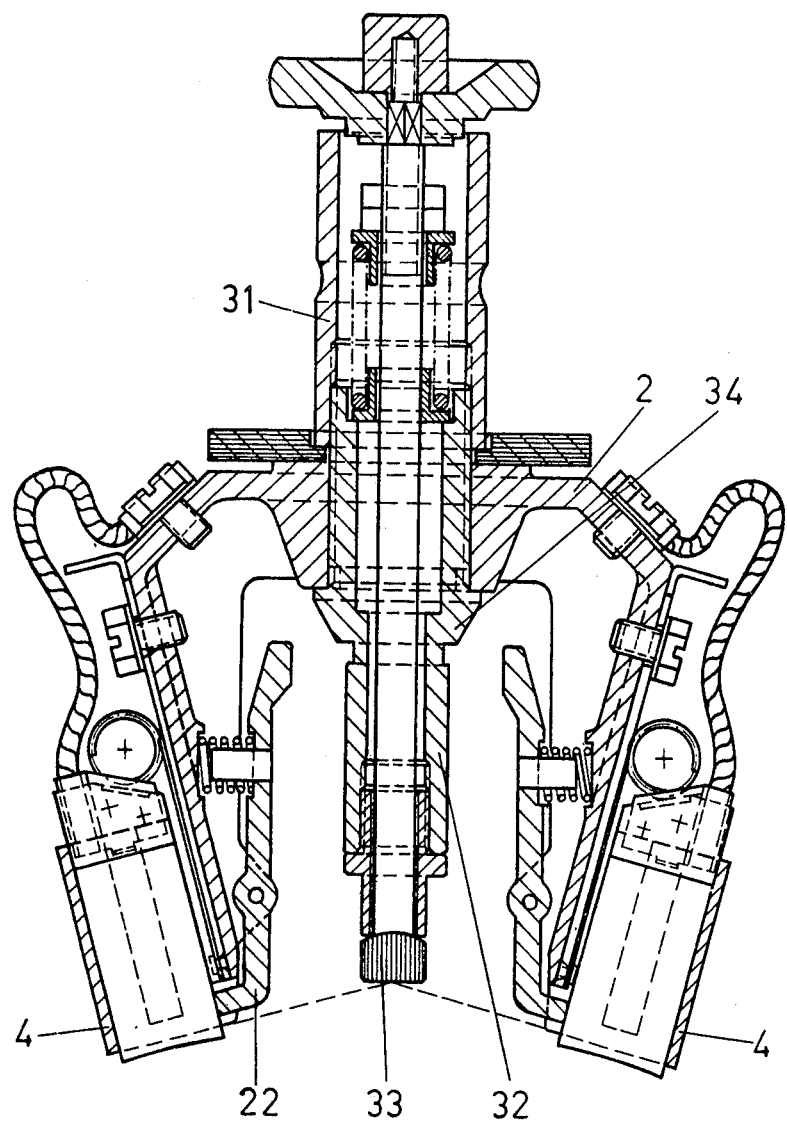
FIG. 9 is a view similar to FIG. 8 but with the parts shown in section.
Figure 10:
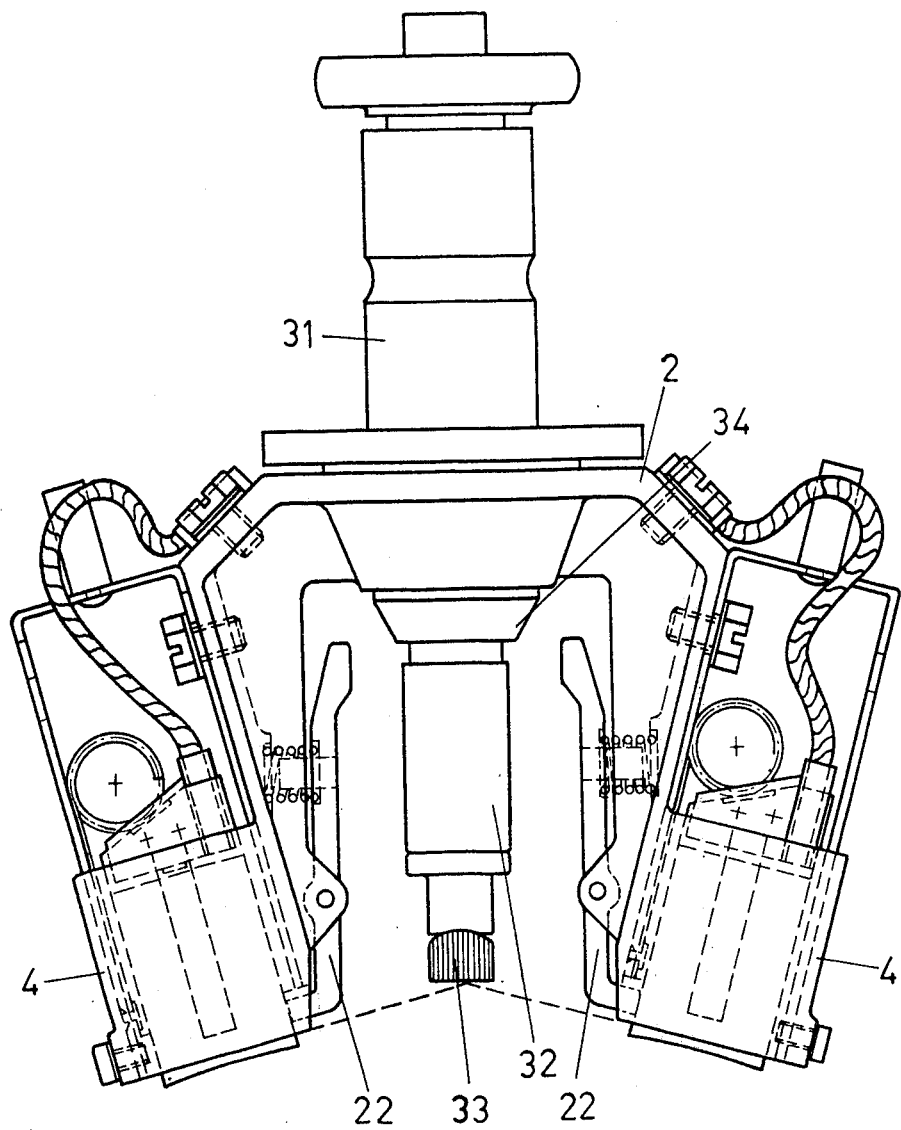
FIG. 10 is a view similar to FIG. 8 but wherein the brush spring support has a U-shape, the support accommodating two adjacent rolled tape springs.
Figure 11:
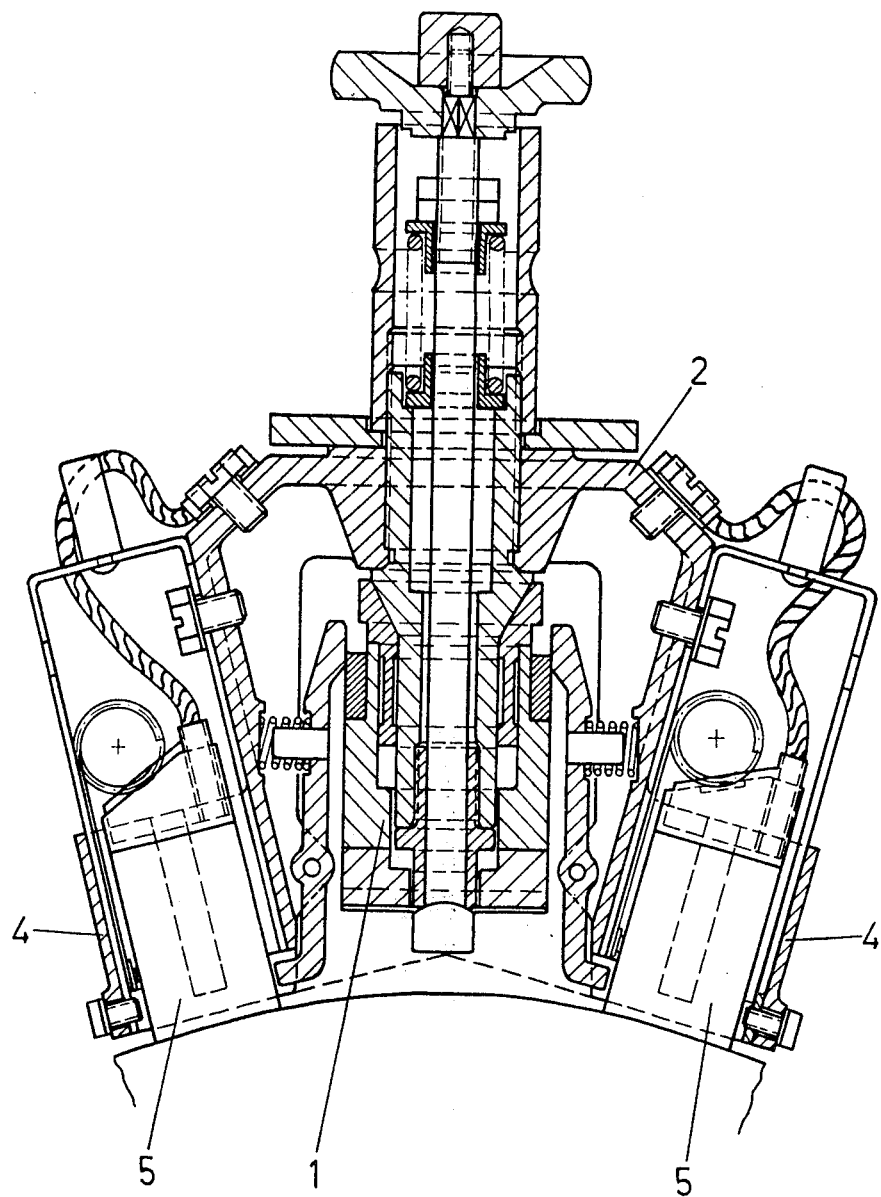
FIG. 11 is a view similar to FIG. 10 but with the parts shown in section and which further includes the brush rail structure into which the mounting and plug-in contact device is removably inserted and locked.
Figure 12:
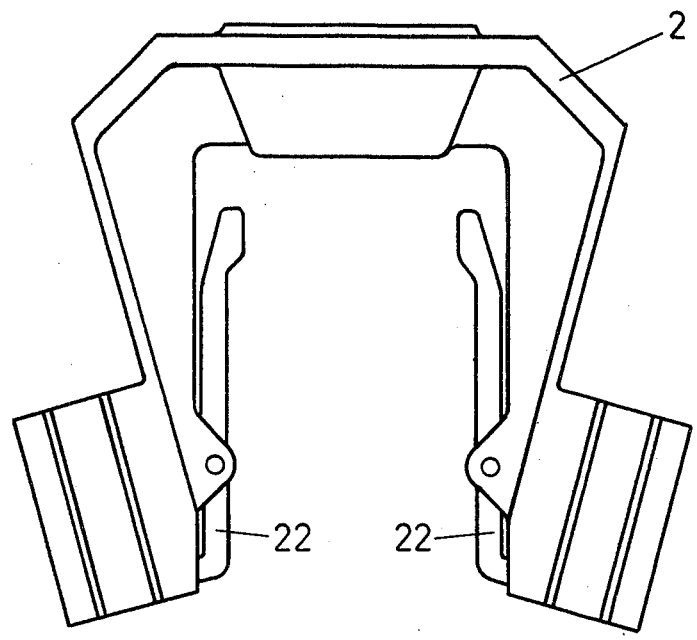
FIG. 12 is a side elevation of an inverted U-shaped support member and brush box structure.
Figure 13:
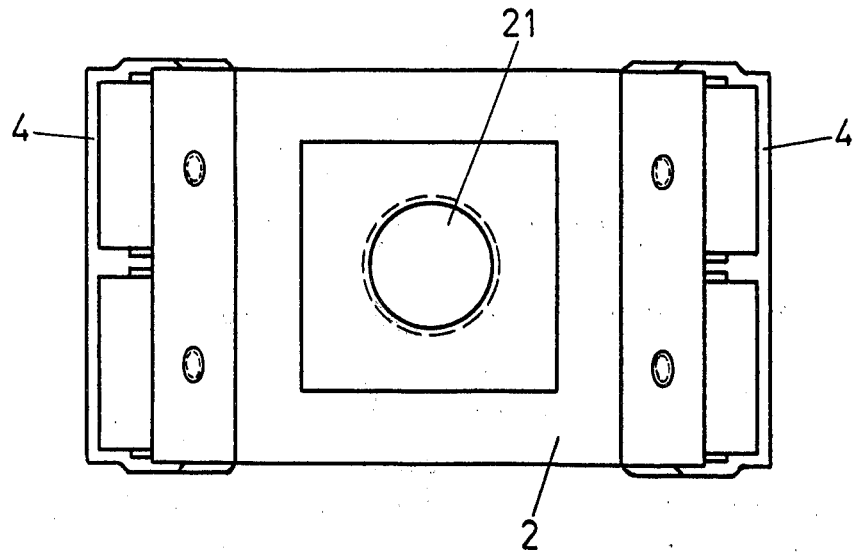
FIG. 13 is a top plan view of the support member and brush box structure shown in FIG. 12.
Figure 14:
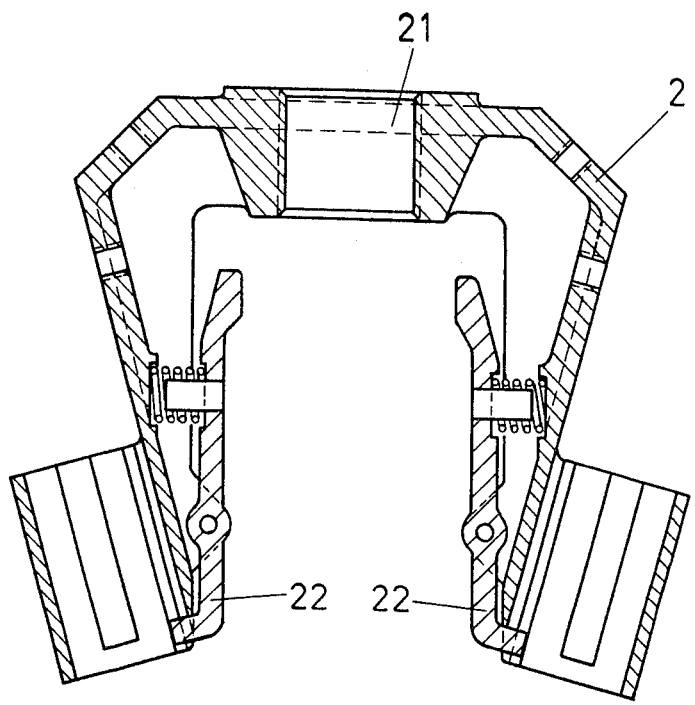
FIG. 14 is a view similar to FIG. 12 but with the parts shown in section.
Figure 15:
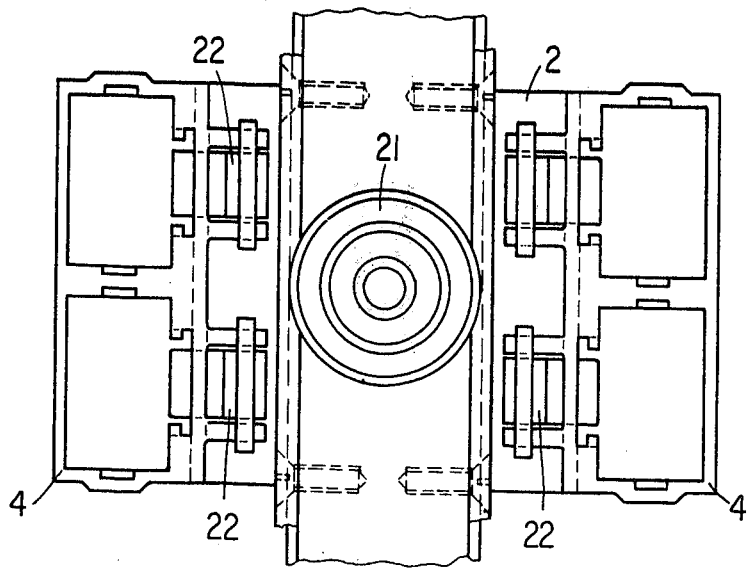
FIG. 15 is a view corresponding to FIG. 13 but shown in cross section.

As has been explained, an intermediate threaded part 36 of the plug-in contact device 3 is screwed into a threaded bore 21 in the support member 2 so as to become a fixed part thereof. The mounting and plug-in contact device 3, illustrated by itself in FIG. 6, further includes a lower contact section 32 for making electrical contact with the brush rail 1 into a bore 12 of which it is inserted, a conical seat 34 engageable with a complementary conical seat 16 provided at the upper side of the brush rail 1 for guiding the plug-in contact device 3 into the receiving bore 12 provided for it in the rail. A bore extends through the entire length of the plug-in contact device 3 for receiving an interlocking spindle 35 which terminates at its lower end in an interlocking head 33. The upper end of spindle 35 terminates in a four-sided shaft 37 onto which is placed an operating handle 38 made of insulating material which enables the spindle 35 to be rotated relative to the plug-in contact device 3. Spindle 35 is maintained under an axial loading pressure by means of a spring 39 which surrounds the spindle, the lower end of spring 39 bearing against a fixed stop at the upper end of the threaded part 36 and the upper end of the spring bearing against a stop secured to the spindle so that the latter is spring-biased in the upward direction. This biassing action maintains the interlocking head 33 of the spindle 35 in engagement with the groove 15 in the component 14 located at the under side of the brush rail 1 and thus locks the spindle in place and hence also the inserted contact section 32 of the plug-in device in electrical contact with the brush rail 1. In order to remove the plug-in device 3 and the brush box mounting structure 2 secured to it from the brush rail 1 the operator simply presses downward upon the handle 38 thus moving the spindle 35 downwardly against the counter biasing action of spring 39 until the interlocking head 33 clears the groove 15 in the part 14. The spindle is then turned until the head 33 is aligned with that part of the non-circular bore in the part 14 at which the head and spindle can be withdrawn through the bore thus releasing the entire plug-in contact device to be withdrawn and along with it the brush box support structure 2. To facilitate removal of the connected together brush support structure 2 and plug-in contact device 3, a tubular cylindrical hand gripping member 31 made of insulating material is provided and includes an internal threaded lower end portion which is screwed onto the upper threaded end of the intermediate part 36.

In the various embodiments of the invention as illustrated in FIGS. 8 to 15, the brush box support member 2 is seen to have an inverted U-shape with one brush box mounted on each radial leg 25 of this member. The other structural details of these embodiments are essentially identical with those as shown in FIGS. 1 to 5 and 7 and hence do not require further description. The current-carrying stranded wires are secured directly to the brush box support member 2 but the arrangement utilized in the embodiment of FIG. 1 for connection of the brush wire could be used if desired.

I claim:

1. A removable brush holder structure for use in conjunction with a dynamoelectric machine in which electrical contact is established between the brush and the surface of a collector ring or commutator component on the rotor of the machine for current transfer therebetween comprising an electrically conductive support member having at least one depending leg portion directed towards the rotor, at least one open bottom brush box secured to the outer side of said leg portion, a brush located in said brush box, an electrical connection from a wire lead on said brush to said leg portion, spring means engageable with the upper end of said brush for loading the lower end of said brush into contact with the collector ring or commutator, a brush retaining lever pivotally mounted intermediate the ends thereof at the inner side of said leg portion, spring loading means for said lever, said electrically conductive support member including a bore for receiving and securing at least one combined brush holder mounting and plug-in device insertable into a bore provided in a stationary brush holder rail mounted on the machine and extending axially of the machine, and means for releasably locking said combined brush holder mounting and plug-in device when inserted into place in said brush rail, said spring loading means for said brush retaining lever serving to force the lower end of said lever into engagement with the side of said brush to maintain the position of the brush within the brush box when said combined brush holder mounting and plug-in device has been withdrawn from said brush rail, and the upper end of said brush retaining lever being engageable with a lever deflecting surface on said brush rail upon insertion of said combined brush holder mounting and plug-in device into said brush rail to disengage the lower end of said lever from said brush.

2. A removable brush holder structure as defined in claim 1 wherein said brush box includes means cooperable with complementary means on said brush for preventing downward movement of said brush within said box beyond a lower limit position indicative of maximum allowable brush wear.

3. A removable brush holder structure as defined in claim 2 wherein said means for preventing downward movement of said brush within said box beyond a lower limit position is constituted by a groove in a side wall of said box terminating short of the lower end of the box and a lateral projection on the brush slidable in said groove.

4. A removable brush holder structure as defined in claim 1 wherein said spring means engageable with the upper end of said brush is constituted by a rolled-up tape spring.

5. A removable brush holder structure as defined in claim 1 wherein a plurality of brush boxes and brushes are provided in side-by-side relation and extend parallel to the axis of said machine.

6. A removable brush holder structure as defined in claim 1 wherein said electrically conductive support member is provided with a plurality of bores for receiving and securing a plurality of combined brush holder mounting and plug-in devices.

7. A removable brush holder structure as defined in claim 1 wherein said lever deflecting surface on said brush rail is constituted by a separate wear strip installed thereon.

8. A removable brush holder structure as defined in claim 1 wherein the wire lead on said brush is attached to said brush box.

9. A removable brush holder structure as defined in claim 1 wherein said electrically conductive support member has an L-shaped configuration providing a single leg for attachment of the brush box.

10. A removable brush holder structure as defined in claim 1 wherein said electrically conductive support member has an inverted U-shaped configuration providing dual legs which straddle said combined brush holder mounting and plug-in device and brush rail, and a brush box secured to each said leg.

11. A removable brush holder structure for use in conjunction with a dynamoelectric machine in which electrical contact is established between the brush and the surface of a collector ring or commutator component on the rotor of the machine for current transfer therebetween comprising an electrically conductive support member having at least one depending leg portion directed towards the rotor, at least one open bottom brush box secured to the outer side of said leg portion, a brush located in said brush box, an electrical connection from a wire lead on said brush to said leg portion, spring means engageable with the upper end of said brush for loading the lower end of said brush into contact with the collector ring or commutator, a brush retaining lever pivotally mounted intermediate the ends thereof at the inner side of said leg portion, spring loading means for said lever, said electrically conductive support member including a bore for receiving and securing at least one combined brush holder mounting and plug-in device having a tubular configuration insertable into a bore provided in a stationary brush holder rail mounted on the machine and extending axially of the machine, means for releasably locking said combined brush holder mounting and plug-in device when inserted into place in said brush rail comprising an axially spring-loaded interlocking spindle mounted for rotation within said combined brush holder mounting and plug-in device, an interlocking head located at the lower end of said spindle for establishing an interlock with said brush rail upon a partial turning movement of said spindle and an operating handle secured to the upper end of said interlocking spindle, said spring loading means for said brush retaining lever serving to force the lower end of said lever into engagement with the side of said brush to maintain the position of the brush within the brush box when said combined brush holder mounting and plug-in device has been withdrawn from said brush rail, and the upper end of said brush retaining lever being engageable with a lever deflecting surface on said brush rail upon insertion of said combined brush holder mounting and plug-in device into said brush rail to disengage the lower end of said lever from said brush.

12. A removable brush holder structure as defined in claim 11 wherein the axial spring loading for said interlocking spindle is constituted by a compression spring surrounding said spindle, the upper end of said spring bearing against a stop secured to the spindle and the lower end of said spring bearing against a stop provided by a surface of said combined brush holder mounting and plug-in device.

13. A removable brush holder structure as defined in claim 11 and which further includes a cylindrical tubular hand grip made of insulating material secured upon said combined brush holder mounting and plug-in device above said support member and below said operating handle for said interlocking spindle.

* * * * *